Feb. 27, 1962 — M. H. PARKS — 3,022,632
BREAKWATER

Filed Oct. 31, 1955 — 2 Sheets-Sheet 1

INVENTOR.
Mercer H. Parks,
BY John D. Schneider
ATTORNEY.

Feb. 27, 1962    M. H. PARKS    3,022,632
BREAKWATER
Filed Oct. 31, 1955    2 Sheets-Sheet 2
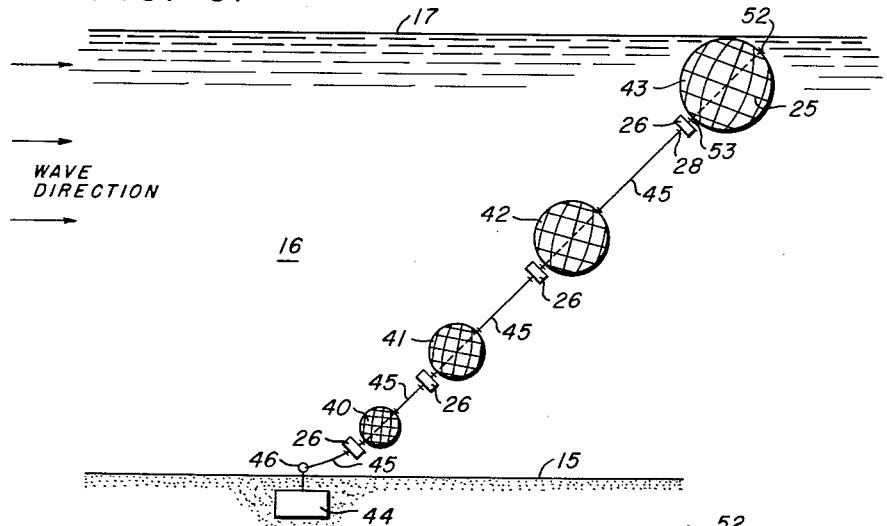
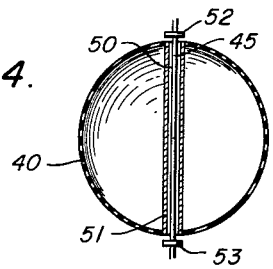
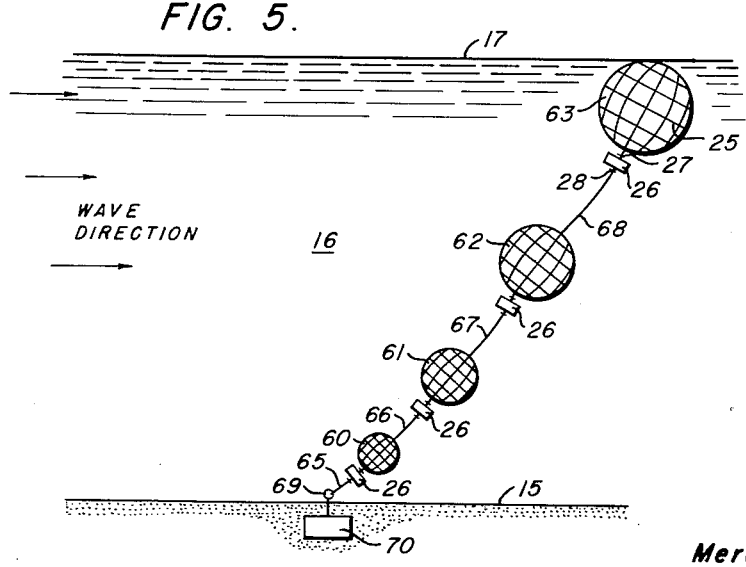
INVENTOR.
Mercer H. Parks,
BY
John J. Schneider
ATTORNEY.

United States Patent Office 3,022,632
Patented Feb. 27, 1962

3,022,632
BREAKWATER
Mercer H. Parks, Houston, Tex., assignor, by mesne assignments, to Jersey Production Research Company, Tulsa, Okla., a corporation of Delaware
Filed Oct. 31, 1955, Ser. No. 543,744
6 Claims. (Cl. 61—5)

This invention is directed to a breakwater adaptable for use with offshore structures such as drilling rigs or for land installations, such as piers, wharves, etc.

Particularly, this breakwater device comprises a deformable, elastic fluid inflated means which is adapted to be positioned at least partially submerged below the water surface. More particularly, the breakwater device is adapted for protecting offshore structures from wave action occurring between the water surface and the earth underlying the water and comprises a plurality of vertically spaced, deformable, elastic fluid inflated bladders of generally spherical configuration. These bladders are secured by anchor means to the earth underlying the water and extend upwardly to adjacent the water surface. The bladders are of successively increasing size from the lowermost bladder positioned adjacent the earth underlying the water to the uppermost bladder positioned adjacent the water surface. These bladders may be positioned in a horizontally staggered array a sufficient distance from the structure to be protected from wave action in the direction of the wave front or force and extending beyond the structure a sufficient distance in a direction transverse to the wave front or force to provide a quiescent area of water adjacent the structure.

Fluid bubbles, such as air bubbles, have been employed as breakwaters to collapse water waves and provide an area of quiescent water adjoining or adjacent to floating structures or land structures. In this practice, air or gas bubbles are released preferably below the horizontal plane of water wave action as a screen and bubble to the surface of the water. As the bubbles travel from the releasing point below water to the surface of the water where they disappear in the atmosphere, they enlarge in size due to the variance or difference in water pressure at the surface of the water and at the releasing point below the water surface, the pressure of the water being greater at the lower or releasing point water depth. Provision of a screen of air bubbles requires piping and means for releasing the air adjacent the area to be protected. Furthermore, means for supplying air under pressure is required. Such an arrangement is cumbersome, expensive, and often impractical.

In the present invention a deformable, vertical, permanent "wall of bubbles" is employed against which the waves break and collapse. In this instance the "bubbles" are maintained in position or anchored by providing elastic fluid inflated bladders positioned relatively stationary in the water and the bladders are of a permanent nature, that is, once fixed there is no need to provide for a continued supply as is necessary with air or gas bubbles. One major disadvantage to the use of air bubbles is that the air escapes too rapidly and it is difficult or impossible to supply the air fast enough for effective breakwater operation.

Generally, the action of the breakwater of the present invention depends upon the difference in the time of transmission of compression waves caused by the water waves through the elastic, fluid-filled bladders and the water surrounding the bladders. Also it is believed that the elastic, fluid-filled bladders will absorb some of the wave energy created by the water waves arising above the still water level through compression of elastic fluid in the bladders and that this energy is returned to the water during the time when the water level is below the still water level. Still water level, as used herein, means the level of the water if no waves are present either at high tide or low tide.

The bladders are preferably of a spherical shape or configuration similar in design to bubbles of air or gas and, as the bubbles of gas, noted supra, increase in size from the lowermost release point to the uppermost water surface escape point, so the bladders of this invention are preferably of successively increased size from the lowermost bladder to the uppermost bladder. The elastic fluid pressure within the bladders is that just sufficient to keep the bladders extended in a round or oval shape. A counter-weight is preferably employed and associated with each bladder to reduce the positive buoyancy of the bladders in order to reduce the stresses on the connecting members used to attach the bladders to the anchor means.

Referring to the drawings:

FIG. 3 is a vertical view of a modified set of bladders;

FIG. 4 is a vertical sectional view of a modified bladder according to the embodiment of FIG. 3; and, FIG. 5 is a vertical view of another modified set of bladders.

Figure 1:
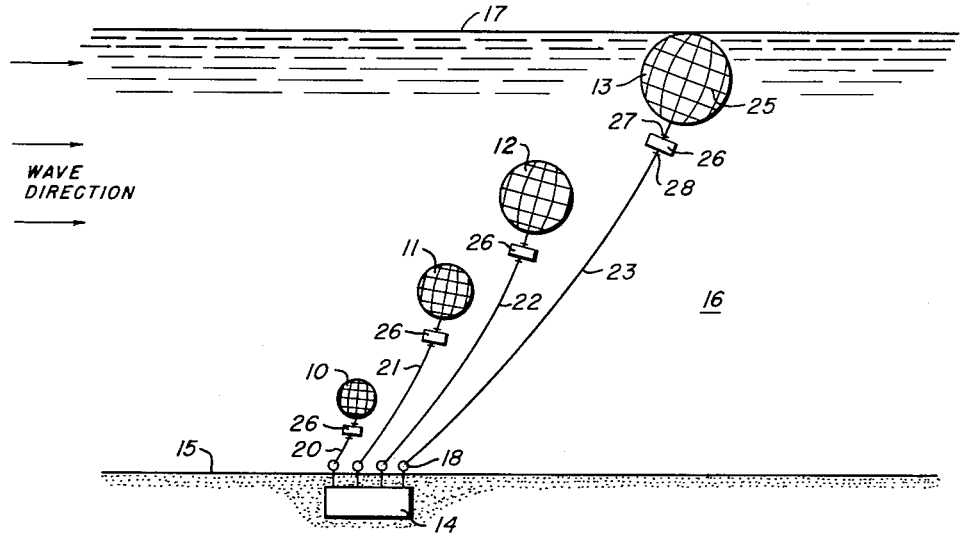
FIG. 1 is a vertical view of a set of bladders in operating position.

Referring more particularly to the drawings in which identical numerals will designate identical parts, FIG. 1 illustrates a set of bladders 10, 11, 12, and 13. These bladders are secured to an anchor 14 embedded in the earth 15 underlying water 16 which has a still water surface level 17. The bladders 10, 11, 12, and 13 are secured to the anchor 14 by any desired means such as rings or eyebolts 18 through anchor chains or cables 20, 21, 22, and 23, respectively. The bladders may be provided with a surrounding retaining mesh 25 which may comprise any durable cord, fabric, or metallic material. The cables 20 through 23 are tied or otherwise secured to the mesh retainers 25 on each associated bladder respectively. A counter-weight 26 is arranged on each of the cables 20 through 23 adjacent bladders 10 through 13, respectively. The counter-weights may be any heavy material such as stone blocks, iron or steel weights, etc. It is also conceivable that the counter-weight may comprise a hollow container filled with a liquid ballast such as water. In the present instance a stone block 26 is employed having a central opening through which the cables 20 through 23 pass. Adjustable stop members 27, 28 are secured to the cables on each side of stone block 26. These stop members may be any obstruction which prevents movement of the stone blocks 26 on their respective cables such as knots or rat-guard type members secured to the cables. The individual counter-weights 26 reduce the stresses in cables 20 through 23 attached to anchor 14 by off-setting the upward buoyant force of the bladders. The bladders have sufficient buoyancy to keep the bladders and counter-weights vertically positioned.

The uppermost and largest bladder 13 is shown positioned just below the still water level 17. While this is the preferred usage, it is contemplated that bladder 13 may extend above the still water level although remaining partially submerged in water 16. As noted supra, it is preferred that the bladders be of a spherical configuration; however, any configuration such as cylindrical may be used. Also, although preferably the bladders are of increasing size from the lower-most bladder 10 to uppermost bladder 13, this invention encompasses the concept of any varying size bladders or of bladders of substantially similar size.

While it is preferred to connect the bladders to the anchor 14 by separate cables, as shown in FIG. 1, this invention also contemplates connecting the bladders strung bead-like on a single cable which would be attached to anchor 14 similarly to the attachment of the individual cables shown. Two embodiments of such structure are illustrated in FIGS. 3 through 5.

Figure 2:
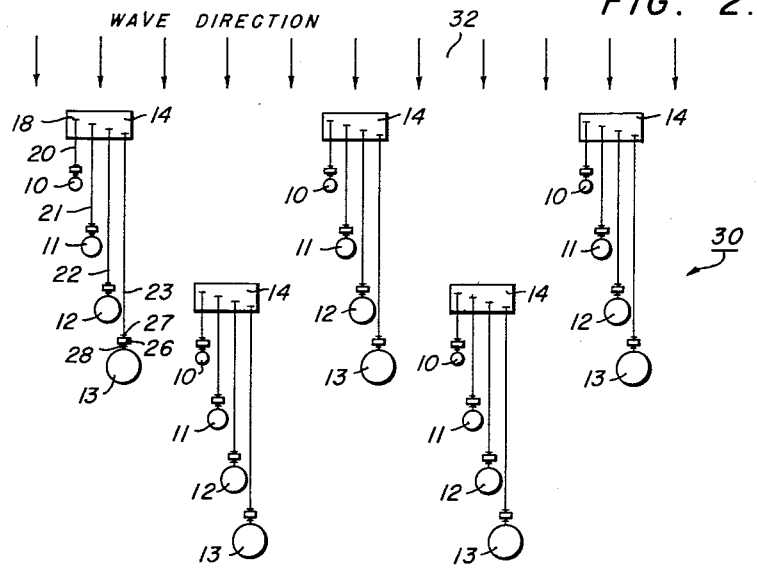
FIG. 2 is a top view of an array of a plurality of the set of bladders of FIG. 1 in operating position.
Figure 2:
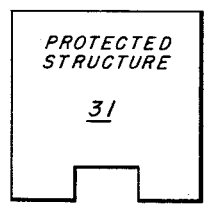

FIG. 2 discloses an array of the set of vertically spaced bladders of FIG. 1, generally designated 30. These sets may be suitably arranged, spaced in a horizontal plane and positioned in staggered relation to each other as shown. They are to be preferably positioned a sufficient distance from the structure 31 to be protected, which may suitably be a drilling rig, in the direction of the wave front or force generally designated 32 and extend beyond structure 31 a sufficient distance transverse to the direction of the wave front 32 to provide an area of quiescent water adjacent structure 31.

In operation, the sets of bladders 10 through 13 and counter-weights 26 are secured to cables 20 through 23 which are secured to anchor 14, the cable lengths 20 through 23 having been previously adjusted so as to position the bladders 10 through 13, respectively, at any desired water depths. In this adjustment the force of the waves are to be considered to compensate for the horizontal movement caused thereby, as shown. The sets of bladders are then lowered in the water and arrayed in staggered positions as shown in FIG. 2. The bladders may be inflated to the desired pressure prior to sinking the anchor or an automatic inflating device may be provided for inflating the bladders as or after they are positioned. The wave front 32 strikes the bladders and the energy of the waves is dissipated by the bladders thereby quieting the water area adjacent structure 31.

The modification of FIG. 3 illustrates a set of bladders 40 through 43 of increasing size from the earth 15 underlying water 16 to the water surface 17 secured to an eyebolt 46 in an anchor 44 embedded in the earth 15 similarly to the embodiment of FIG. 1. However, herein the bladders 40 through 43 are threaded on a cable 45 and strung bead-like along the length thereof. Counter-weights 26 and associated stop members 27, 28 may be positioned on cable 45 adjacent each bladder similarly to the FIG. 1 embodiment.

A more detailed showing of one of the threaded bladders of FIG. 3 is seen in FIG. 4. The spherically configured bladder is provided with an axial or central opening 50 through which cable 45 extends. Opening 50 may be provided with a cylindrical sheath 51 formed of any durable material in order to prevent frictional wear and stress on the bladder surface adjacent cable 45. Cable 45 has retaining stop members 52 and 53 affixed thereto above and below each of the bladders 40 through 43. These bladder retaining stops may be similar in construction to the counter-weight retaining stops described supra and serve to prevent the bladders from sliding or moving relative to cable 45. The lower bladder stop member 53 may also function as the upper counter-weight stop member 27 as illustrated in FIG. 3. A retaining mesh 25 may surround and contain each of the bladders similarly to the FIG. 1 embodiment.

The modification shown in FIG. 5 is similar to the two previous embodiments of the invention; however, the bladders herein are strung bead-like although not threadedly as in the embodiment of FIGS. 3 and 4. A plurality of spherically configured bladders 60 through 63 are shown connected to individual cable lengths 65 through 68 by means of mesh 25 surrounding and containing each of the bladders. Lowermost cable 65 is secured to an eyebolt 69 connected to anchor 70 embedded in the earth 15 underlying water 16 having a surface level 17. Suitable counter-weights 26 with associated stop members 27, 28 are shown affixed to the individual cable lengths 65 through 68 below each of the bladders 60 through 65 similarly to the previous embodiments.

The operation of arranging and positioning the bladders of FIGS. 3 through 5 in the water so as to provide an effective breakwater for an offshore structure is the same as the operation of arranging and positioning the bladders of FIG. 1, described supra.

The invention is not to be considered as limited to the particular staggering array, as shown in FIG. 2, as any desired grouping or array, such as stringing the individual groups in an aligned position parallel to the wave front, may be employed.

While only four bladders are illustrated in each embodiment, the invention contemplates using one or more bladders in any single set.

What I wish to claim is:

1. A device adapted to protect offshore structure from wave action occurring between the water surface and the earth underlying the water comprising a plurality of vertically spaced, deformable, elastic fluid inflatable, spherically configured bladders of successively increased size in the direction of said water surface, and extending from adjacent the earth underlying the water to adjacent said water surface, and anchoring means connected to said bladders adapted to secure said bladders to said earth.

2. A device as recited in claim 1 wherein said anchoring means comprises an anchor and separate cables securing each of said plurality of bladders to said anchor.

3. A device as recited in claim 1 wherein said anchoring means comprises an anchor and a single cable securing said bladders to said anchor.

4. A device as recited in claim 3 wherein stop means are provided on said cable for retaining each of said bladders on said cable.

5. A device as recited in claim 1 wherein each of said bladders has a counter-weight means associated therewith.

6. A device as recited in claim 1 wherein said vertically spaced bladders are arranged in horizontally spaced staggered relation a sufficient distance from said structure in the direction of said wave action and extend beyond said structure a sufficient distance in a direction transverse to said wave action to cause quiescence of said wave action adjacent said structure.

References Cited in the file of this patent

UNITED STATES PATENTS

| | | |
|---|---|---|
| 307,393 | Hyde | Oct. 28, 1884 |
| 1,385,166 | Bagnall | July 19, 1921 |
| 2,044,795 | Knight | June 23, 1936 |

FOREIGN PATENTS

| | | |
|---|---|---|
| 598,125 | Great Britain | Feb. 11, 1948 |

OTHER REFERENCES

Proceedings of the First Conference on Coastal Engineering, October 1950, chapter II, pp. 7–18.